July 26, 1927.
A. E. MAYNARD
1,637,024
LENS MEASURE
Filed April 25, 1925
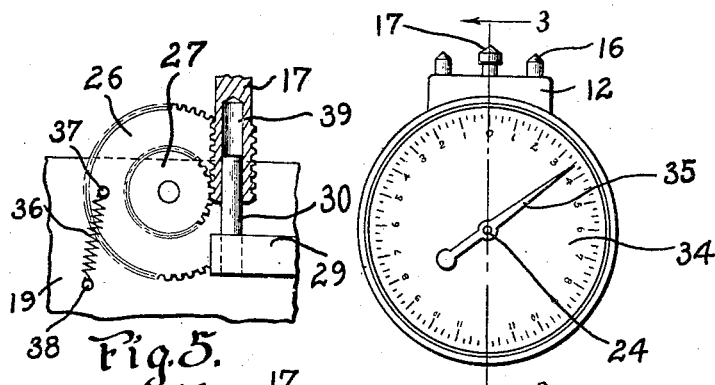
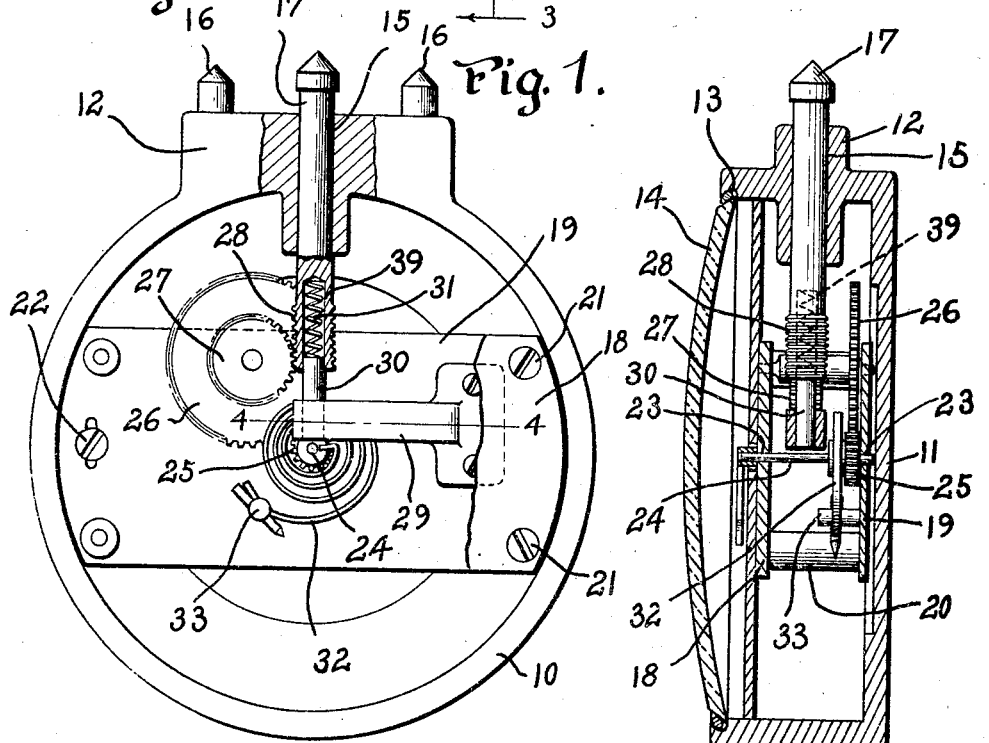
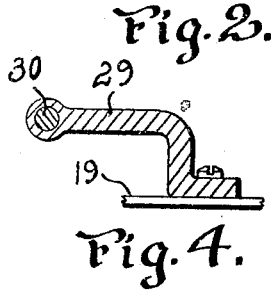
Inventor
Albert E. Maynard.
By Harry H. Styll.
Attorney Patented July 26, 1927.

1,637,024

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS MEASURE.

Application filed April 25, 1925. Serial No. 25,785.

The present invention relates to that class of measuring instruments by means of which the degree of curvature of spherical and cylindrical lenses may be mechanically ascertained, and wherein is provided a graduated scale of dioptric value of lens surfaces.

The present day requirements of the optical trade are so exacting that from the workmen in the shop to the dealer or oculist, all must be provided with some convenient means for measuring the foci of lenses with precision and ease. The various parts used in the construction of devices of this character are naturally quite small and in order that the instrument may function with accuracy, it is very essential that these parts be so constructed and mounted that all danger of their coming out of proper adjustment, even to the slightest degree, will be obviated.

Heretofore, in instruments of this kind, one of the greatest difficulties encountered has been that the parts were not mounted with sufficient rigidity as a result of which the constant using of the device caused the parts to lose their fine adjustment with the natural consequence that the curvature of the lenses was not accurately measured and recorded.

It is, therefore, the primary object of the present invention to provide such a device of this character of greater rigidity and durability than those heretofore produced.

Another object is to provide such a device wherein the various parts will be so constructed and assembled that all danger of them coming out of adjustment will be eliminated.

Another object is to provide such a device wherein all possibilities for errors will be entirely overcome.

Another object is to provide such a device which will be of simplified construction and easy to operate.

Other objects and advantages will be apparent during the course of the following description, taken in connection with the accompanying drawing.

In the drawings forming a part of this application;

Fig. 1, is a front elevation of a lens measure, constructed in accordance with the present construction.

Fig. 2, is a similar view on a larger scale, with the dial removed and parts broken away to more clearly show the construction.

Fig. 3, is a vertical transverse sectional view on the line 3—3 of Fig. 1.

Fig. 4, is a fragmentary sectional view taken on the line 4—4 of Fig. 2.

Figure 5 is a fragmentary view showing a modification of the present invention.

Referring more particularly to the accompanying drawing, wherein like characters of reference denote corresponding parts, throughout the several views, it will be noted that in carrying the invention into practice, there is provided a cylindrical casing 10 having a bottom wall 11 and at one side the usual point block 12. The open face of the casing is formed with a circumferential groove 13 for the reception of the crystal 14. The point block 12 is provided with a central bore 15 and positioned at opposite sides of said bore are the stationary contact pins 16. Slidably mounted within the bore 15 is a plunger 17, having the recess 39 formed in its inner end. The plunger 17 extends slightly beyond the pins 16 and while the outer end of this plunger and also the ends of the pins 16 are shown as being pointed, they may, of course, be made round if desired.

Within the casing 10, is mounted the upper plate 18 and the lower plate 19 which are spaced apart by collars 20 through which pass the screws 21 for holding the plates together. The lower plate 19 is secured to the bottom wall 11 by means of the fastening screws 22.

The upper and lower plates are formed with the centrally disposed and aligned openings 23, which form a bearing for the central shaft 24, which is provided adjacent the lower plate with a pinion 25, arranged to mesh with the gear 26, carried by the lower plate 19. Extending forwardly from the gear 26, and secured thereto is a smaller gear 27, which meshes with the toothed rack 28, formed on the inner end of the plunger 17.

Secured to the lower plate 19, is a bracket 29 carrying the pin 30, which is received within the recess 19, formed in the inner end of the plunger. Positioned within the recess and bearing against the said pin 30, is a coil spring 31 which tends to normally urge the plunger outwardly.

A spiral spring 32 is secured at one end to the shaft 24 and at the other end to a post 33 carried by the lower plate 19 in such a way that tension is always applied to rotate the said shaft. This spring 32 is also provided to take up the back lash between the pinion 25 and the gear 26.

In use the lens measure is applied to the surface of a lens in the usual manner, whereby the plunger 17 will be forced inwardly and motion imparted through the gear 27 to the gear 26 which will in turn rotate the shaft 24. Arranged outside of the plate 18 is the usual dial 34, suitably graduated in diopters and mounted on the shaft 24 beyond the dial is a pointer 35. Thus it will be seen that the inward movement of the plunger will cause the pointer to rotate and indicate on the dial the degree of curvature of the surface of a lens. After the pressure has been removed from the plunger 17, the spring 31 will cause the same to move outwardly to its normal position, with the result that the shaft 24 will be operated in the opposite direction and the pointer returned to its normal position.

The bracket 29 and the pin 30 serve to retain the toothed rack 28 in proper mesh with the gear 27. If this construction was not provided, the constant using of the instrument would in time cause the toothed rack 28 to lose its fine adjustment relative to the gear 27.

In the modification of the invention shown in Figure 5, the various parts are constructed and assembled in the same manner as illustrated and described in connection with the preferred form, with the exception of the means for urging the plunger 17 outwardly. Instead of positioning a spring within the recess 39, there is employed a spring 36 having one end secured, as at 37, to the gear 26, and its opposite end secured, as at 38, to the lower plate 19, so that as the plunger 17 is forced inwardly the gear 26 will be rotated and cause the spring 36 to be extended, with the result that when pressure upon the said plunger is released the spring will contract to assume its normal position, thereby causing the gear 26 to rotate in the opposite direction and force the plunger outwardly.

From the above it will be readily apparent that there has been provided a lens measure of great rigidity and durability and which will efficiently and accurately measure and record the curvature of a lens. While I have necessarily shown and described a preferred embodiment of my invention, it is to be understood that it may be necessary to vary the size, shape, and arrangement of the parts, and that this may be done without departing from the principles of the invention and the scope of the claims.

What I claim is:

1. In a device of the character described, a casing, an indicator carrying shaft mounted within said casing, a reciprocating plunger carried by said casing and having a recess in one end thereof, means for changing the reciprocating movement of the plunger to rotary movement in said shaft, a bracket within said casing, a pin secured to said bracket and partially received within said recess and spring means contained within said recess and bearing against said pin for normally urging the said plunger away from said bracket.

2. In a device of the character described, a casing, an indicator carrying shaft mounted within said casing, a reciprocal plunger carried by said casing means to impart rotary movement to said shaft from the reciprocation of the plunger, a bracket within said casing, means carried by said bracket to position the reciprocating plunger and yielding means contacting with the plunger and positioning means to normally urge the plunger away from the bracket.

3. In a device of the character described, the combination with an indicator carrying shaft, of a reciprocal plunger means to impart rotary movement to the shaft from the reciprocation of the plunger, said plunger having a recess in one end, means within said recess for holding the plunger in reciprocal alignment, and spring means for normally urging said plunger away from the aligning means in the recess.

4. In a device of the character described, the combination with an indicator carrying shaft, of a plunger means to impart rotary movement to the shaft from the plunger, said plunger having a recess in one end, a bracket carried by said casing, means carried by the bracket and received within said recess for retaining said plunger in reciprocal alignment, and spring means for normally urging the said plunger away from the bracket.

5. In a device of the character described, a casing, an indicator carrying shaft mounted within said casing, a reciprocating plunger carried by said casing, means to impart rotary movement to said shaft from the reciprocating plunger, said plunger having a recess in one end, a bracket carried by said casing, means carried by said bracket and received within said recess for retaining said plunger in reciprocal alignment, and spring means for normally urging said plunger away from the bracket.

ALBERT E. MAYNARD.